Dec. 20, 1966    R. R. PETERSON    3,292,711

BLADE PITCH CHANGE BEARING

Filed March 30, 1965    3 Sheets-Sheet 1

INVENTOR.
Robert R. Peterson
BY Ralph Hammar
Attorney

Dec. 20, 1966 R. R. PETERSON 3,292,711
BLADE PITCH CHANGE BEARING
Filed March 30, 1965 3 Sheets-Sheet 2

INVENTOR.
Robert R. Peterson
BY Ralph Hammar
attorney

Dec. 20, 1966   R. R. PETERSON   3,292,711
BLADE PITCH CHANGE BEARING
Filed March 30, 1965   3 Sheets-Sheet 3

INVENTOR.
Robert R. Peterson
BY
Ralph Hammar
Attorney

United States Patent Office 3,292,711
Patented Dec. 20, 1966

3,292,711
BLADE PITCH CHANGE BEARING
Robert R. Peterson, Erie, Pa., assignor to Lord Corporation, Erie, Pa., a corporation of Pennsylvania
Filed Mar. 30, 1965, Ser. No. 443,993
15 Claims. (Cl. 170—160.53)

This invention is an elastomeric torsion joint or bearing such as used for blade pitch change of helicopters, autogyros and the like. In this bearing, the elastomer is stressed in compression by the heavy centrifugal load of the rapidly whirling blades and is stressed in shear by the change in blade pitch. The bearing has materially longer life than conventional bearings where the loads are carried by relatively movable lubricated surfaces. In such bearings, instability of the kind found in tall thin columns is present when the height to width ratio is too large. This problem is overcome by several structures.

Figure 1:
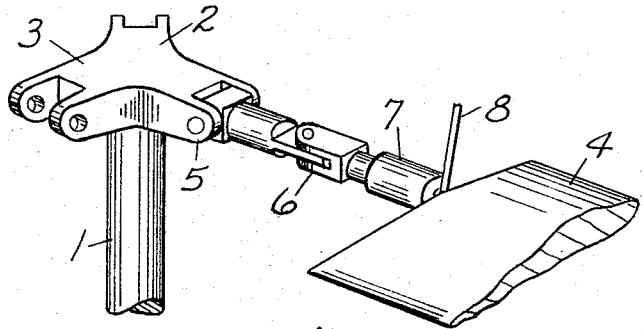
Figures 3, 4:
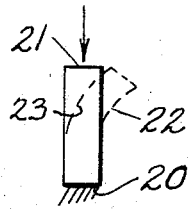
Figure 2:
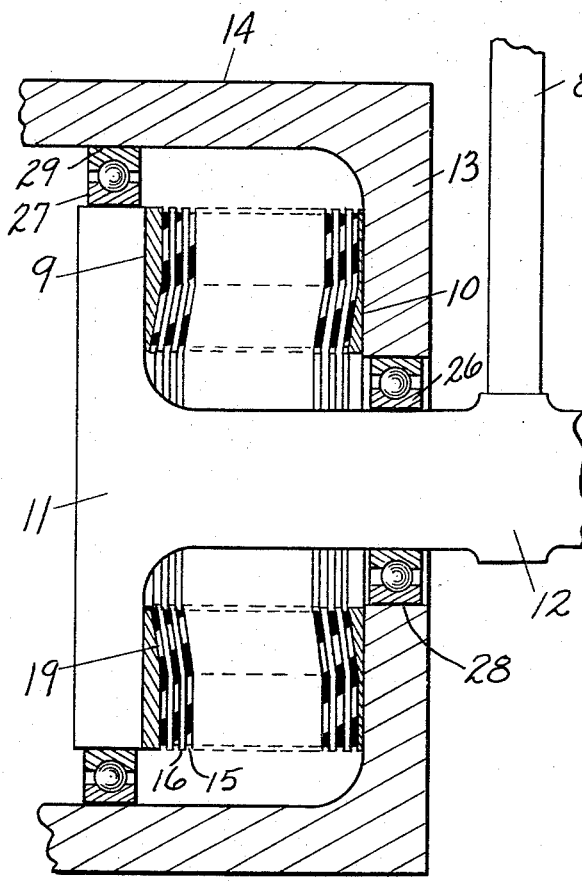
Figure 5:
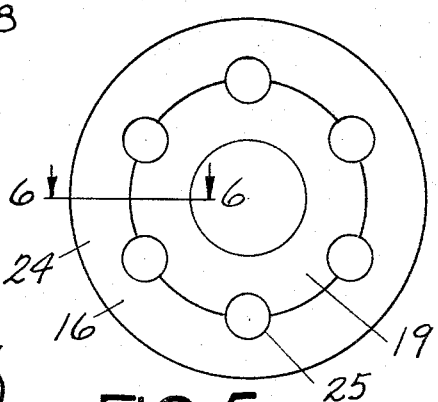
Figure 6:
Figure 7:
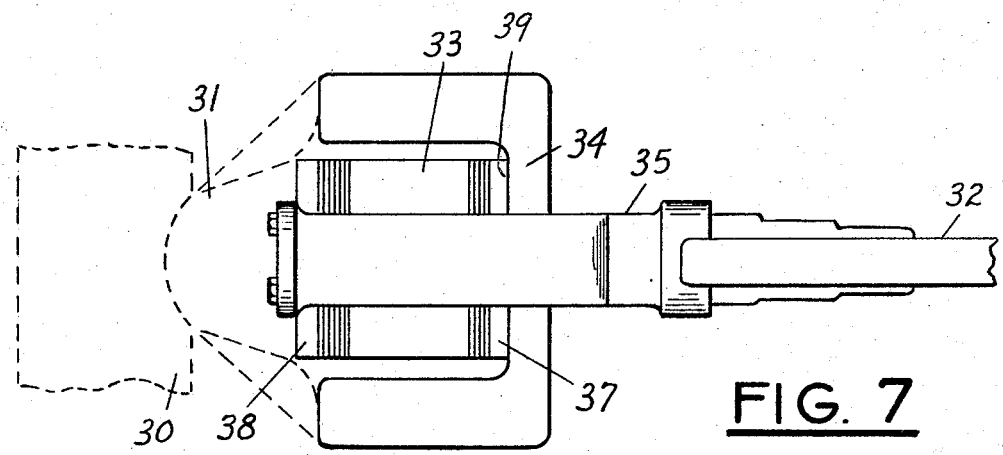
Figure 8:
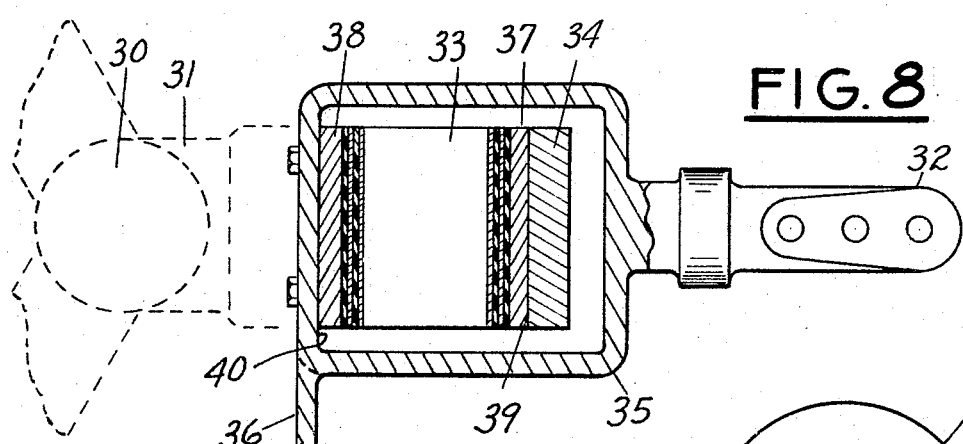
Figures 9, 11:
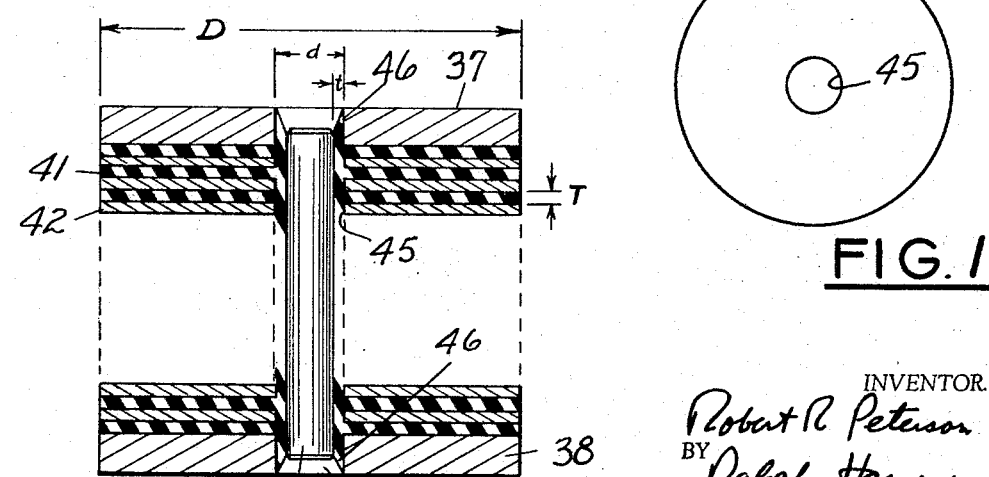
Figure 10:
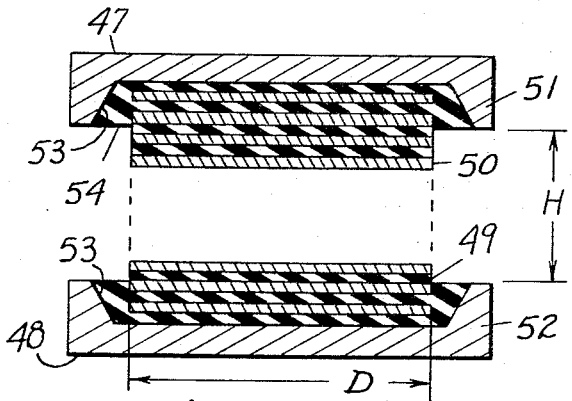
Figure 12:
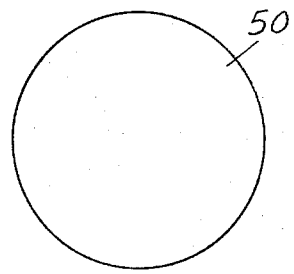
Figure 13:
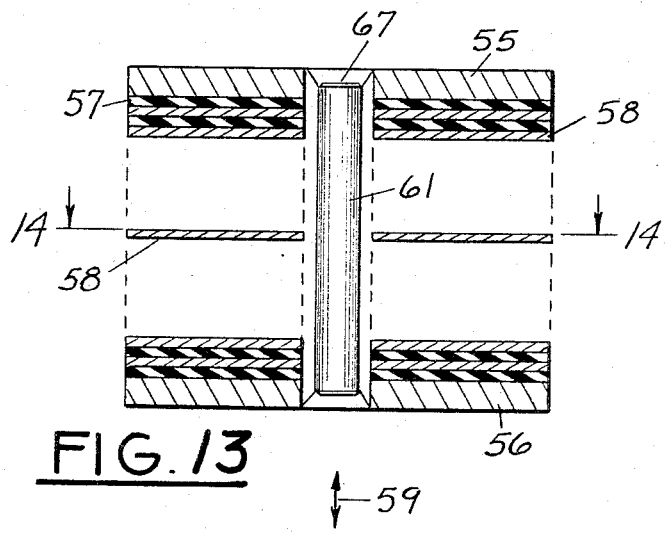
Figure 14:
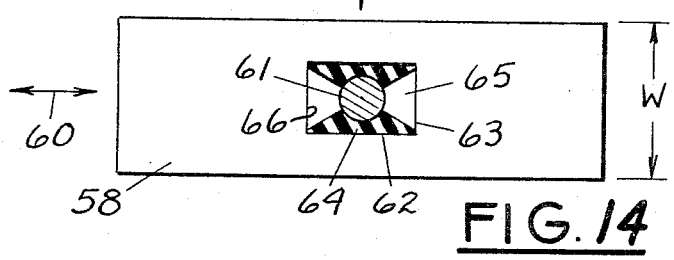
Figure 15:
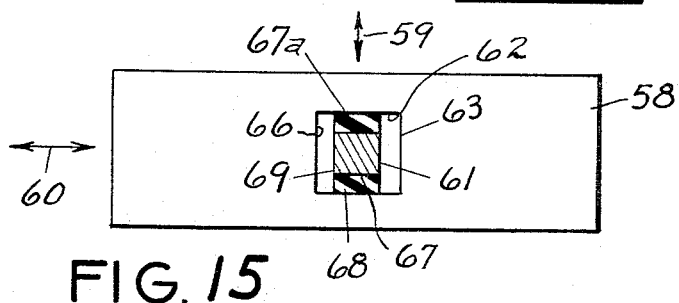

In the drawing, FIG. 1 is a diagrammatic perpspective of a helicopter rotor head, FIG. 2 is a longitudinal section through the blade pitch change bearing, FIGS. 3 and 4 are diagrammatic views explaining the principle of operation of the pitch change bearing, FIG 5 is a plan view of one of the metal shims in the pitch change bearing, FIG. 6 is a section on line 6—6 of FIG. 5, FIG. 7 is a diagrammatic elevation of a helicopter rotor head having a modification of the pitch change bearing, FIG. 8 is a diagrammatic plan view of the helicopter rotor head, FIG. 9 is a longitudinal section through the blade pitch change bearing of FIGS. 7 and 8, FIG. 10 is a longitudinal section through a modification of the pitch change bearing, FIG. 11 is a plan view of one of the metal shims for the FIG. 9 bearing, FIG. 12 is a plan view of one of the metal shims for the FIG. 10 bearing, FIG. 13 is a longitudinal section through a bearing having differential stiffness in lateral directions, FIG. 14 is a section on line 14—14 of FIG. 13, and FIG 15 is a view similar to FIG. 14 of a modification.

In the drawing, 1 indicates a helicopter rotor shaft having a hub 2 with a plurality of radially projecting arms 3 each of which carries a blade 4. The connections between the blades 4 and the arms 3 include flap hinges 5, lead lag hinges 6, and a pitch change bearing 7. In the small helicopters, the flap and lead lag hinges 5 and 6 are usually omitted. The pitch change bearing 7 is always present. By means of suitable pitch change linkage, of which only an arm 8 fixed to the blade is shown, the blade is rotated about its longitudinal axis at the same speed as the shaft 1 to vary the pitch of the blade during its rotation. The angle of pitch change is small (typically ±6° to 8°) and the huge centrifugal forces of the blades cause early failure of conventional bearings where there is little relative motion between lubricated surfaces.

In this invention, the pitch change motion is accommodated by an elastomeric sandwich joint comprising axially spaced annular end plates 9 and 10 parallel to each other and concentric with and normal to the longitudinal axis of the blade. The end plate 9 is suitably fixed to an outwardly projecting flange 11 on the stem 12 fixed to and extending along the longitudinal axis of the blade 4. The end plate 10 is suitably fixed to an inwardly extending flange 13 on a cylindrical member 14 connected to the arm 3 through joints 5, 6. In load carrying relation between the end plates 9, 10 is a body 15 of elastomer having embedded therein a plurality of spaced metal shims 16 parallel to each other and the end plates 9, 10. The elastomer is bonded to opposite sides of the shims 16 and to the opposed surfaces of the end plates 10, 9 and sustains the loads generated by centrifugal force on the blades 4 by direct compression stress. The effect of the shims 16 is to resist or prevent bulging of the elastomer under compression stress so that the compression load is taken primarily by the bulk modulus of the elastomer. Since the elastomer is highly incompressible, the stiffness of the mounting under compressive stress is greatly increased by the presence of the shims 16.

The shear sandwich mounting 9, 10, 15, 16 has a stability problem illustrated diagrammatically in FIGS. 3 and 4. If the shims 16 and the end plates 9, 10 were wholly flat with surfaces parallel to each other, under compression load the mounting would tend to assume the shape illustrated in FIG. 3. The elastomer at the center would tend to squeeze outward from between the end plates so that the contour of the outer surface would assume the general C-shape indicated by dotted lines 17, 18. The direction of curvature of the lines 17, 18 need not be to the right as illustrated in FIG. 3, but could be in any direction radial to the axis of the mounting. This effect can be thought of as though the elastomer and shims at the center of the column were being squeezed outward by unbalanced bulging forces due to the compression load. That is, as the compression load is applied along the axis of the mounting, forces at right angles to the axis of the mounting are developed and unbalance in these forces causes movement of the elastomer at right angles to the axis of the mounting. When the elastomer shifts laterally with respect to the axis of the mounting, its load carrying ability rapidly decreases and it is no longer suitable to carry the heavy compression loads.

One expedient for preventing the lateral shifting of the elastomer and shims 16 is to make the shims of domed or frustoconical shape as shown at 19. If all the shims 16 were wholly frusto-conical, it would not be possible for the shims at the center of the column of elastomer to shift transversely to the axis of the mounting. However, another form of instability such as illustrated in FIG. 4 tends to develop. Under compression load, if the lower end 20 of the mounting is held fixed, the upper end 21 of the mounting tends to rotate to one side of the axis of the mounting, producing the shape illustrated by dotted lines 22, 23. The rotation illustrated by lines 22, 23 need not be to the right as illustrated but can be in any radial direction. Similarly, the rotation may start at either end, i.e., end 20 may rotate about end 21 instead of the opposite rotation illustrated. As the mounting rotates as illustrated in FIG. 4, its load carrying ability rapidly decreases.

In the mounting shown in FIG. 2, both of these unwanted effects are prevented by having the central section of the shims 16 of domed or frusto-conical shape 19 and by having the outer section of the shims 16 of plane or flat shape 24. The frusto-conical shape 19 is at a very shallow angle, preferably substantially 10°, although it can be somewhat less or somewhat greater. The effect of this shallow frusto-conical section 19 is to interlock with each other and positively prevent the lateral bulging of the elastomer of the kind indicated by dotted lines 17, 18 in FIG. 3. The shallow angle accomplishes this result without materially interfering with the efficiency of the mounting. While the same result could be accomplished by steeper angles, that would be at the expense of decreasing the efficiency of the mounting by requiring more elastomer and more axial space between the end plates 9, 10 in order to carry a given deflection.

The flat sections 24 of the shims prevent the rocking or rotational movement of the elastomer of the kind indicated by dotted lines 22, 23 in FIG. 4. The resistance of the elastomer to compression holds the shims 16 in substantial parallel relation to each other and prevents the out of parallel relationship necessary if the elastomer is to rock or rotate to the positions indicated by dotted lines 22, 23. By this combination of domed and flat shapes, the mounting is obtained which withstands high compressive loads without the problem of instability which would be present if the shims were either wholly conical or wholly flat.

In the particular mounting illustrated, the elastomer is rubber, the outside diameter of the mounting is four inches, the height of the mounting (the distance between the remote faces of plates 9, 10) is 1.62 inches, the inside diameter of the end plates 9, 10 and of the shims 16 is 1.88 inches, the thickness of the shims is .025 inch, the spacing (the thickness of the elastomer) between the shims is .030 inch, the distance between the opposed faces of the end plates 9, 10 is 1.24 inches and the rated load carrying ability under compression is approximately 100,000 pounds or approximately 10,000 pounds per square inch. This is a rated load for continuous operation which involves the usual factors of safety. Higher loads have been carried.

To achieve this load carrying ability, the end plates 9, 10 and the shims 16 must be rigid so as to behave as structural members and not merely as members which prevent bulging of the elastomer under compressive load. For example, the shims 16 could be made much thinner if they were used only to prevent bulging of the elastomer under compressive load. When made thinner, the mounting would exhibit the instability of the kind illustrated in FIG. 3 because the frusto-conical sections 19 would not maintain their shape under load. For this reason, the shims 16 are preferably made of hardened steel and of such thickness that the shape is maintained under load. When the shims are made of softer stock such as annealed sheet steel, there is a tendency for the shims to assume a permanent deformation under load, thereby introducing the possibility of instability at the higher loadings.

It will be noted that the shims have a plurality of perforations or holes 25. The purpose of these holes is to equalize the elastomer between the shims.

In operation, the centrifugal load of the blades 4 is carried by direct compression of the elastomer between the flanges 11 and 13. As the blade rotates, during each revolution there is a change of pitch of the order of $\pm 6°$ to 8° introduced by the linkage 8. This pitch change motion is accommodated by shear of the elastomer 15 between the end plates 9 and 10. In the shear mode, the mounting behaves as a column of rubber having a height equal to the cumulative spacings between the shims and the end plates 9 and 10. The presence of the shims 16 has no effect upon the stiffness of the mounting in torsion or shear. Because the elastomer is very soft in shear, very little force on the pitch change linkage 8 is required to change the pitch of the blades. The shims 16, however, do have a very great effect upon the stiffness of the elastomer in compression. By confining the rubber between closely spaced shims, bulging of the elastomer under compressive load is substantially prevented and the stiffness of the elastomer in compression corresponds very closely to its bulk modulus which is many (5000 or more) times its modulus of elasticity in shear.

The bending load on the spindle 12 due to the weight of the blades is taken by bearings 26 and 27 respectively fixed to the spindle 12 and the flange 11. These bearings do not take any of the centrifugal load because the bearing 26 has a sliding fit on the inner surface 28 of the flange 13 and the bearing 27 has a sliding fit on the inner surface 29 of the member 14. The bearings 26 and 27 also do not take any of the pitch change load by reason of the sliding fits. Bearings 26, 27 merely hold the flanges 11, 13 concentric with or in fixed relation to the longitudinal axis of the blade while offering no restraint to movement of the flanges 11, 13 along or about the longitudinal axis of the blade.

In the rotor head of FIGS. 7 and 8, 30 indicates the rotor shaft to which are fixed radially projecting arms 31, each of which carries a blade 32. In this rotor head, the flap and lead lag hinges are eliminated and the centrifugal loads and blade pitch change taken by a pitch change bearing 33 arranged between a member 34 fixed to the arm 31 and a member 35 fixed to the blade 32. The pitch change linkage has an arm 36 fixed to the member 35 to rotate the blade about its longitudinal axis.

The pitch change bearing 33 is a sheer sandwich joint which comprises annular end plates 37 and 38 respectively fixed to a radially inward facing surface 39 on the member 34 and a radially outwardly facing surface 40 on the member 35. Between the members 37 and 38 is a cylindrical body 41 of elastomer in which are embedded rigid annular metal shims 42 bonded to the elastomer. The purpose of the shims is to restrain bulging of the elastomer under compressive load without interfering with the shear stiffness of the elastomer. The pitch change motion is accommodated by torsional shear of the elastomer between the members 37 and 38. Because the elastomer is very soft in shear, very little force on the pitch change linkage is required to change the pitch of the blades. The shims 42 greatly increase the stiffness of the elastomer under compressive load by confining the elastomer between the closely spaced shims so that the stiffness of the elastomer corresponds very closely to its bulk modulus.

Under compressive load, the FIG. 9 bearing tends to have the kind of column instability illustrated in FIG. 3. That is, the shims 42 tend to squeeze radially outward from between the end plates 37, 38 causing the elastomer 41 to assume a general C-shape in which the load carrying ability is greatly decreased. To prevent this lateral shifting of the shims 42, there is bonded in the center of the body 41 a floating metal pin 43. The ends 44 of the pin are spaced inward from the outer surfaces of the end plates 37, 38 to allow freedom for compression of the elastomer under axial load. The outer surface of the pin 43 is spaced a distance "t" from the inner edges of the center openings 45 and 46 in shims 42 and end plates 37, 38. As the shims 42 tend to shift laterally, the elastomer between the outer surface of the pin 43 and the inner edges of the center openings 45, 46 is compressed radially and because of the small spacing, the elastomer is extremely rigid and positively prevents the lateral shifting. The thickness "t" of elastomer surrounding the pin 43 is adequate to accommodate torsional movement about the axis of the pin without overstressing the elastomer. Equal stress distribution is obtained when the thickness "t" or rubber around the pin is equal to half the thickness "T" of elastomer between adjacent shims multiplied by the factor $d/D$ where $d$ is the diameter of the center openings 45, 46 and D is the outside diameter of the metal shims 42 and end plates 37, 38. Because the diameter of the center opening of the metal shims is always much smaller than the outside diameter of the metal shims, very close spacing between the center pin 43 and the center openings 45 in the shims will not overstress the elastomer. At these very close spacings, the elastomer is essentially incompressible so that lateral shifting of the shims under compressive load is positively prevented.

FIGS. 10 and 12 show another form of shear sandwich joint which may be substituted for the pitch change bearing in the FIGS. 7 and 8 rotor head. This joint comprises rigid metal end plates 47 and 48 bonded to opposite ends of a cylindrical body 49 of elastomer. To prevent bulging under axial compressive load without affecting the shear stiffness, there are embedded and bonded in the elastomer a plurality of rigid metal discs or shims 50 which have the property of restraining bulging and thereby increasing the stiffness. In this joint, the effective height "H" of the joint is reduced to such a low value compared to the outside diameter "D" of the elastomer that the problem of buckling column instability is avoided. This is accomplished by depending flanges 51 and 52 respectively on the end plates 47 and 48 which encircle the associated end of the body 49 of elastomer. The inner surfaces 53 of the flanges flare outwardly and are bonded to the elastomer providing a section 54 of elastomer bridging the space between the outer edges of the shims and the flange. The section 54 accommodates torsional or shear motion of the flanges relative to the elastomer. Flaring equalizes the shear stress under torsional motion. By reason of the flanges 51, 52 and the intervening sections 54 of elastomer, the effective height of the column 49 of elastomer is reduced to "H" which is so short compared to the diameter "D" that column instability is avoided.

The FIG. 9 joint is rigid in all lateral directions transverse to its axis as well as in the compression direction along its axis. The FIG. 10 joint is as rigid as the FIG. 9 joint in the compression direction but may be equal to or less rigid than FIG. 9 in directions lateral or transverse to its axis where the elastomer is stressed in shear, depending upon the height of the flanges 51, 52. Both joints are equally soft in torsion about their axes. Both joints may be of rectangular or other shaped section rather than of circular section as shown.

FIGS. 13–15 show modifications of the elastomeric sandwich joint of FIGS. 9 and 11 in which rectangular metal end plates 55 and 56 are respectively bonded to opposite ends of a rectangular body 57 of elastomer having bonded therein closely spaced rigid rectangular metal shims 58. A similar modification may be made of the FIG. 10 joint. Because of the relatively great height of the body 57 of elastomer as compared to its width "W," there is the problem of column instability caused by lateral motion of the shims 58 in the direction of arrow 59 under compressive load. There is no problems of column instability in the direction of arrow 60 because the ratio of the height of the body of elastomer to the width measured in the direction of arrow 60 is too small to cause instability. Instability in the direction of arrow 59 is prevented by bonding a floating rigid metal center pin 61 into the elastomer. The center pin is substantially equally spaced from sides 62 of rectangular openings 63 in the shims 58. A relatively thin section 64 of elastomer between the pin 61 and each of the sides 62 resists by compressive stress any lateral shifting of the shims 58 in the direction of arrow 59. So long as lateral shifting of the shims is prevented, the load carrying ability of the sandwich is maintained. There are cored out openings 65 between the center pin 61 and each of the sides 66 of the opening 63 which permit lateral shifting or shearing of the end plates 55 and 56 relative to each other in the direction of arrow 60 so that the joint can be relatively soft in this direction. This softness does not introduce the problem of instability because of the relatively large dimension of the shims and elastomer in the direction of arrow 60.

As in the FIG. 9 joint, the ends 67 of the pin 61 are recessed inward from the outer surfaces of the members 55 and 56 to provide clearance for deflection of the elastomer under compression load.

FIG. 15 shows an alternative design in which a square or rectangular center pin 61' is used with sides 67a spaced from and parallel to the sides 62 of the openings 63. The sections 68 of elastomer between the sides 67a of the pin and the sides 62 of the opening resist lateral shifting of the shims in the direction of arrow 59 under compressive load, thereby preventing instability. The sides 69 of the center pin 61' are spaced from the sides 66 of the opening 63 providing space to accommodate lateral or shear movement between the end plates 55 and 56 in the direction of arrow 60.

What is claimed as new is:
1. A rotor having a plurality of blade drive arms each associated with a blade, a first joint member fixed to the inner end of the blade and having a surface normal to the longitudinal axis of the blade and facing the outer end of the blade, a second member fixed to the arm and having a surface normal to said axis and spaced radially outward of the surface on said first member, a body of elastomer in load carrying relation between and having its ends respectively fixed to said surfaces, said body having a height to width ratio such that in the absence of other structure instability of the kind found in tall thin columns is present, a plurality of shims spaced from each other and from said surfaces embedded in and bonded to the elastomer and normal to said axis, each shim having a plane section at its periphery and a domed section at its center intersecting the plane section at an angle of substantially 10°, said shims and said surfaces of the joint members being rigid so as to maintain their shape under load and coacting with the elastomer to overcome said instability, pitch control means for twisting the first joint member relative to the second joint member, and bearing means for preventing tilting of the first joint member about an axis transverse to said longitudinal axis.

2. A torsion joint comprising first and second joint members respectively having surfaces opposed to each other and normal to an axis, a body of elastomer in load carrying relation between and having its ends respectively fixed to said surfaces, said body having a height to width ratio such that in the absence of other structure instability of the kind found in tall thin columns is present, a plurality of shims parallel to and spaced from each other and from said surfaces, said shims being embedded in and bonded to the elastomer and normal to said axis, each shim having a plane section at its periphery and a domed section at its center intersecting the plane section at an angle of substantially 10°, said shims and said surfaces of the joint members being rigid so as to maintain their shape under load and coacting with the elastomer to overcome said instability.

3. A rotor having a plurality of blade drive arms each having a radially extending axis, a joint between each blade and its blade comprising a spindle extending along said axis and fixed to the blade and having a first flange normal to said axis, a member fixed to the arm having an annular second flange normal to said axis surrounding the spindle and spaced radially outward of the first flange, an annular body of elastomer surrounding the spindle between said flanges, said body having a height to width ratio such that in the absence of other structure instability of the kind found in tall thin columns is present, an annular end plate fixed to each of said flanges, said end plates respectively having an annular surface presented to and bonded to one and the other end of the body of elastomer, a plurality of annular shims parallel to and spaced from each other and said surfaces of the end plates, said shims being embedded in and bonded to the elastomer, each shim having a plane section adjacent its periphery and a frusto-conical section at its center intersecting the plane section at an angle of substantially 10°, said shims and end plates being rigid so as to maintain their shape under load and coating with the elastomer to overcome said instability, pitch control means for twisting the spindle relative to said member to control the pitch of the blade, and bearing means between said spindle and member for preventing tilting of the spindle about an axis transverse to said spindle.

4. A rotor having a plurality of blade drive arms each associated with a blade, a first joint member fixed to the inner end of the blade and having a surface normal to the longitudinal axis of the blade and facing the outer end of the blade, a second member fixed to the arm and having a surface normal to said axis and spaced radially outward of the surface on said first member, a body of elastomer in load carrying relation between and having its ends respectively fixed to said surfaces, said body having a height to width ratio such that in the absence of other structure instability of the kind found in tall thin columns is present, a plurality of shims spaced from and parallel to each other and said surfaces, said shims being embedded in and bonded to the elastomer and normal to said axis, each shim having a plane section at its periphery and a shallow section at its center, said shims and said surfaces of the joint members being rigid so as to maintain their shape under load and coacting with the elastomer to overcome said instability, pitch control means for twisting the first joint member relative to the second joint member, and bearing means for preventing tilting of the first joint member about an axis transverse to said longitudinal axis.

5. A rotor having a plurality of blade drive arms each associated with a blade, a first joint member fixed to the inner end of the blade and having a surface normal to the longitudinal axis of the blade and facing the outer end of the blade, a second member fixed to the arm and having a surface normal to said axis and spaced radially outward of the surface on said first member, a body of elastomer in load carrying relation between and having its ends respectively fixed to said surfaces, said body having a height to width ratio such that in the absence of other structure instability of the kind found in tall thin columns is present, a plurality of shims spaced from and parallel to each other and said surfaces, said shims being embedded in and bonded to the elastomer and normal to said axis, each shim having shallow projections registering and interlocking with adjacent shims to resist shifting of the shims transverse to said axis, said shims and said surfaces of the joint members being rigid so as to maintain their shape under load and coacting with the elastomer to overcome said instability, pitch control means for twisting the first joint member relative to the second joint member, and bearing means for preventing tilting of the first joint member about an axis transverse to said longitudinal axis.

6. A rotor having a plurality of blade drive arms each associated with a blade, a first joint member fixed to the inner end of the blade and having a surface normal to the longitudinal axis of the blade and facing the outer end of the blade, a second member fixed to the arm and having a surface normal to said axis and spaced radially outward of the surface on said first member, a body of elastomer in load carrying relation between and having its ends respectively fixed to said surfaces, said body having a height to width ratio such that in the absence of other structure instability of the kind found in tall thin columns is present, a plurality of shims spaced from and parallel to each other and said surfaces, said shims being embedded in and bonded to the elastomer and normal to said axis, each shim having sections registering and occupying a minor portion of the area of the shims and interlocking with adjacent shims to resist shifting of the shims transverse to said axis, said shims and said surfaces of the joint members being rigid so as to maintain their shape under load and coacting with the elastomer to overcome said instability, pitch control means for twisting the first joint member relative to the second joint member, and bearing means for preventing tilting of the first joint member about an axis transverse to said longitudinal axis.

7. A rotor having a plurality of blade drive arms each associated with a blade, a first joint member fixed to the inner end of the blade and having a surface normal to the longitudinal axis of the blade and facing the outer end of the blade, a second member fixed to the arm and having a surface normal to said axis and spaced radially outward of the surface on said first member, a body of elastomer in load carrying relation between and having its ends respectively fixed to said surfaces, said body having a height to width ratio such that in the absence of other structure instability of the kind found in tall thin columns is present, a plurality of shims spaced from and parallel to each other and said surfaces, said shims being embedded in and bonded to the elastomer and normal to said axis, each shim having projecting sections occupying a minor portion of the area of the shims and intersecting the shims at an angle of substantially 10°, said projections registering and interlocking with adjacent shims to resist shifting of the shims transverse to said axis, said shims and said surfaces of the joint members being rigid so as to maintain their shape under load and coacting with the elastomer to overcome said instability, pitch control means for twisting the first joint member relative to the second joint member, and bearing means for preventing tilting of the first joint member about an axis transverse to said longitudinal axis.

8. A torsion joint comprising first and second joint members respectively having surfaces opposed to each other and normal to an axis, a body of elastomer in load carrying relation between and having its ends respectively fixed to said surfaces, said body having a height to width ratio such that in the absence of other structure instability of the kind found in tall thin columns is present, a plurality of shims parallel to and spaced from each other and said surfaces, said shims being embedded in and bonded to the elastomer and normal to said axis, each shim having shallow projections registering and interlocking with adjacent shims to resist shifting of the shims transverse to said axis, said shims and said surfaces of the joint members being rigid so as to maintain their shape under load and coacting with the elastomer to overcome said instability.

9. A torsion joint comprising first and second joint members respectively having surfaces opposed to each other and normal to an axis, a body of elastomer in load carrying relation between and having its ends respectively fixed to said surfaces, said body having a height to width ratio such that in the absence of other structure instability of the kind found in tall thin columns is present, a plurality of shims parallel to and spaced from each other and said surfaces, said shims being embedded in and bonded to the elastomer and normal to said axis, each shim having sections registering and occupying a minor portion of the area of the shims and interlocking with adjacent shims to resist shifting of the shims transverse to said axis, said shims and said surfaces of the joint members being rigid so as to maintain their shape under load and coacting with the elastomer to overcome said instability.

10. A torsion joint comprising first and second joint members respectively having surfaces opposed to each other and normal to an axis, a body of elastomer in load carrying relation between and having its ends respectively fixed to said surfaces, said body having a height to width ratio such that in the absence of other structure instability of the kind found in tall thin columns is present, a plurality of shims parallel to and spaced from each other and said surfaces, said shims being embedded in and bonded to the elastomer and normal to said axis, each shim having projecting sections occupying a minor portion of the area of the shims and intersecting the shims at an angle of substantially 10°, said projections registering and interlocking with adjacent shims to resist shifting of the shims transverse to said axis, said shims and said surfaces of the joint members being rigid so as to maintain their shape under load and coacting with the elastomer to overcome said instability.

11. A rotor having a plurality of blade drive arms each associated with a blade, a first joint member fixed to the inner end of the blade and having a surface normal to the longitudinal axis of the blade and facing the outer end of the blade, a second member fixed to the arm and having a surface normal to said axis and spaced radially outward of the surface on said first member, a cylindrical body of elastomer in load carrying relation between and having its ends respectively fixed to said surfaces, said body having a height to width ratio such that in the absence of other structure instability of the kind found in tall thin columns is present, a plurality of annular shims spaced from each other and from said surfaces embedded in and bonded to the elastomer and normal to said axis, said shims being rigid so as to maintain their shape under load, a floating center pin extending through and presented to the edges of the center openings in the shims, a section of elastomer between the pin and the edge of the center openings for preventing shifting of the shims transverse to said axis, and pitch control means for twisting the first joint member relative to the second joint member.

12. A joint comprising first and second joint members respectively having surfaces opposed to each other and normal to an axis, a body of elastomer in load carrying relation between and having its ends respectively fixed to said surfaces, said body having a height to width ratio such that in the absence of other structure instability of the kind found in tall thin columns is present, a stack of a plurality of shims parallel to and spaced from each other and from said surfaces, said shims being embedded in and bonded to the elastomer and normal to said axis, said shims being rigid so as to maintain their shape under load, each member having a flange spaced from and surrounding the shims at its end of the stack, and a section of elastomer bridging the space between the flange and the shims preventing lateral shifting of the shims under compression load along the axis of the joint.

13. A joint comprising first and second joint members respectively having surfaces opposed to each other and normal to an axis, a body of elastomer in load carrying relation between and having its ends respectively fixed to said surfaces, said body having a height to width ratio such that in the absence of other structure instability of the kind found in tall thin columns is present, a stack of a plurality of shims parallel to and spaced from each other and said surfaces, said shims being embedded in and bonded to the elastomer and normal to said axis, said shims being rigid so as to maintain their shape under load said shims having openings aligned with each other, a rigid pin extending through said openings, and a section of elastomer between and bonded to the pin and the adjacent edges of the openings for resisting shifting of the shims transverse to said axis.

14. The joint of claim 13 in which the shims and the openings are elongated and there is a clearance between the pin and the edges of the openings in the direction of elongation and the transverse shifting of the shims is resisted in a direction crosswise to the direction of elongation.

15. A joint comprising first and second joint members respectively having surfaces opposed to each other and normal to an axis, a body of elastomer in load carrying relation between and having its ends respectively fixed to said surfaces, a stack of a plurality of shims parallel to and spaced from each other and said surfaces, said shims being embedded in and bonded to the elastomer and normal to said axis, the ratio of the height of the stack of shims to the minimum width of the stack being such as to cause column instability under compression load applied between the joint members, members rigid with at least one of the joint members and extending along and spaced from the outer edges of the stack transverse to the direction of minimum width, and a section of elastomer bridging the space between the outer edges of the stack and said rigid member for preventing lateral shifting of the shims opposed to said rigid member and thereby reducing the effective height of the stack to prevent column instability.

References Cited by the Examiner

UNITED STATES PATENTS

| | | | |
|---|---|---|---|
| 1,921,931 | 8/1933 | Levasseur | 170—160.53 |
| 2,287,316 | 6/1942 | Lord. | |
| 3,111,172 | 11/1963 | Gorndt et al. | 170—160.51 |
| 3,200,887 | 8/1965 | Ballauer | 170—160.25 |

FOREIGN PATENTS 934,336   1/1948   France.

MARTIN P. SCHWADRON, *Primary Examiner.*

EVERETTE A. POWELL, JR., *Examiner.*